United States Patent [19]

Munzer et al.

[11] Patent Number: 4,749,749

[45] Date of Patent: Jun. 7, 1988

[54] COMPATIBLE MIXTURES OF A POLYCARBONATE AND A METHACRYLATE COPOLYMER

[75] Inventors: Manfred Munzer, Bensheim; Winfried Wunderlich, Rossdorf, both of Fed. Rep. of Germany

[73] Assignee: Rohm GmbH Chemische Fabrik, Darmstadt, Fed. Rep. of Germany

[21] Appl. No.: 84,868

[22] Filed: Aug. 13, 1987

[30] Foreign Application Priority Data

Sep. 27, 1986 [DE] Fed. Rep. of Germany ....... 3632946

[51] Int. Cl.$^4$ ............................................. C08L 69/00
[52] U.S. Cl. ..................................... 525/148; 525/146
[58] Field of Search ...................... 525/148, 146, 468; 526/305, 303.1

[56] References Cited

U.S. PATENT DOCUMENTS 3,259,608 7/1966 Hill et al. ............................ 526/305
4,045,514 8/1977 Iwahashi et al. ..................... 525/148

FOREIGN PATENT DOCUMENTS 1394481 5/1975 United Kingdom .

*Primary Examiner*—Theodore E. Pertilla
*Attorney, Agent, or Firm*—Oblon, Fisher, Spivak, McClelland & Maier

[57] ABSTRACT

Transparent, thermoplastically processible polymer mixtures comprised of:

(A) Polycarbonates, particularly bisphenol A polycarbonates; and (B) Copolymers of methyl methacrylate and monosubstituted (meth)acrylamides, the latter present in the amount of 5-25 wt. %, wherein the substituent on the amide nitrogen is a cyclic organic group having an aliphatic, aromatic, or heterocyclic structure, which has no appreciable absorption capability for visible light as far as the UV wavelength of 340 nm.

10 Claims, No Drawings

COMPATIBLE MIXTURES OF A POLYCARBONATE AND A METHACRYLATE COPOLYMER

BACKGROUND OF THE INVENTION

1. Field of the Invention

The invention relates to polymer mixtures, particularly mixtures comprised of an aromatic polycarbonate and a copolymer of methyl methacrylate, which are highly transparent.

2. Discussion of the Background

It is known to mix aromatic polycarbonates, particularly polycarbonates of bisphenol A, with other polymers resulting in compositions which may be multiphasic polymer mixtures, i.e. showing incompatibility (so-called "polymer blends"), or which may be homogenous, i.e. showing compatibility (often called "polymer alloys").

Mixtures of a polymethyl methacrylate molding compound which is a transparent plastic of glass-like clarity, with bisphenol A polycarbonate, which is also a transparent plastic, are not homogenous, transparent "alloys", but rather are mixtures with a pearl-like luster (as such are disclosed in, e.g., Jap. Pat. No. 72-16063).

According to Ger. OS No. 22 64 268, an improved polycarbonate molding compound is obtained if there is added to the polycarbonate an acrylic polymer with low molecular weight, comprising a copolymer of methyl methacrylate in the amount of 90–75 wt. % and an alkyl acrylate in the amount of 10–25 wt. %, which is of the formula

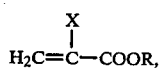

where X represents H or CH$_3$, and R represents an organic group with 4–12 carbon atoms. The copolymer may be added in the amount of 0.01 wt. % to about 50 wt. % based on the weight of the polycarbonate (i.e. of the mixture) without detrimentally affecting the transparence. The viscosity reduction effect increases with increasing amounts of copolymer.

Such copolymers act as polymeric plasticizers. Their molecular weight must be less than 15,000 in order to achieve the described compatibility, according to the present authors' studies with corresponding copolymers.

However, there is a problem in using such polymers to produce polymer "alloys" having technically useful properties in the region of high polymethacrylate content, the problem being namely the known inferiority of mechanical properties in the molecular weight region below 100,000, particularly below 50,000 (see Vieweg and Esser, "Kunststoff-Handbuch", Vol. IX, "Polymethacrylates", pp. 112 ff.).

Ger. Pat. App. No. P 35 18 538.4 describes compatible polymer mixtures comprised of a polycarbonate such as bisphenol A polycarbonate and a copolymer comprised of (a) monomeric esters of acrylic and/or methacrylic acid; (b) alcohols with 1–10 carbon atoms; and (c) a UV-absorbing monomer of formula

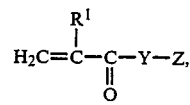

where R$^1$ is hydrogen or a methyl group, and Y is oxygen or a —NR$^2$—group, where R$^2$ is hydrogen or an alkyl group, and Z is a UV-absorbing group, namely a 2-hydroxyphenylbenzotriazol group, a 2-hydroxybenzo- or acetophenon group, or a α-cyano-β,β -diphenyl group.

Such thermoplastically processible polymer mixtures of polycarbonate and copolymers of methyl methacrylate and monomers with good UV absorption are useful as light-protection agents for improving light stability of, e.g. plastics, particularly when used as coatings for the plastics. However, they remain in the specialty area, and are prohibitively costly for broadly applicable thermoplastically processible plastics because of the high cost of the UV absorbers which they incorporate.

There remains a need for compatible mixtures with technically important properties, comprised of a thermoplastic polycarbonate and thermoplastically processible polymers with high proportions of methyl methacrylate and with molecular weights above 30,000, for use in a broad range of applications of the sort typically found for molding compositions.

SUMMARY OF THE INVENTION

Accordingly, one object of the present invention is to provide a process for preparing transparent thermoplastically processible polymer alloys.

Another object of the invention is to prepare transparent polymer alloys which comprise thermoplastic polycarbonate and thermoplastic methyl methacrylate copolymer mixtures which are compatible and which are useful in a broad range of applications.

A further object of the invention is to provide transparent thermoplastically processible polymer mixtures which are economical and easily processed.

These and other objects which will become apparent from the following specification have been achieved by the present transparent thermoplastically processible polymer mixtures which comprise (A) a aromatic polycarbonate; and (B) a methacrylate copolymer, where the methacrylate copolymer comprises (i) 65–95 wt. % methyl methacrylate monomer units and (ii) 5–25 wt. % monosubstituted (meth)acrylamide monomer units having the formula

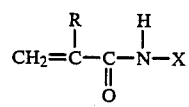

wherein R is H or methyl, X is a organic group with a cyclic part which may be substituted and the cyclic part is from cycloaliphatic, aromatic or heterocyclic structure and wherein X has no appreciable absorption capability for visible light as far as the UV wavelength of 340 nm, and wherein the copolymer (B) has a molecular weight > 30,000.

DETAILED DESCRIPTION OF THE PREFERRED EMBODIMENTS

It has been discovered that highly transparent polymethacrylate resins with plastic properties, and polycarbonates such as bisphenol A polycarbonate, which is regarded as being in the class of high-impact transparent plastics, can, surprisingly, be alloyed to form compatible and also highly transparent novel plastic compositions, if the polymethacrylate resins used comprise copolymers with high proportions (95–65 wt. %) of methyl methacrylate and relatively small amounts (5–25 wt. %) of monosubstituted acrylamides and/or methacrylamides.

This is all the more surprising because general organic chemistry teaches that carboxylic acid amides, particularly unsubstituted or mono-N-substituted amides, form intermolecular hydrogen bonds and, in contrast to the corresponding esters, normally form compounds which are solids at ordinary temperatures and which crystallize. Such compounds are thus expected to bring about incompatibility.

The monosubstituted acrylamides and/or methacrylamides, which are copolymerized with methyl methacrylate and possibly also other $\alpha,\beta$-unsaturated comonomers, and which bring about compatibility of polymethyl methacrylate resin with polycarbonate resin, have the general formula I:

$$\begin{array}{c} R \quad H \\ | \quad | \\ CH_2=C-C-N-X, \\ \| \\ O \end{array} \quad (I)$$

where R is H or $CH_3$; and X is a organic group with a cyclic part which may be substituted and the cyclic part is from cycloaliphatic, aromatic or heterocyclic structure.

Preferred cycloaliphatic groups are those having 5 and 6 carbon atoms which may be substituted with one or more $C_{1-6}$ alkyl groups. Preferred aromatic groups are those having from 6 and 10 carbon atoms in the aromatic ring which may be further substituted with one or more $C_{1-6}$ alkyl groups. Preferred heterocyclic groups are those containing oxygen, sulfur and/or nitrogen in a 5 or 6 membered ring. The heterocyclic group may be aromatic or non-aromatic and may have one or more $C_{1-6}$ alkyl substituents.

Particularly preferred examples of X include cycloaliphatic groups such as cyclohexyl, 2-methylcyclohexyl, and 4-methylcyclohexyl; aromatic groups such as phenyl and benzyl; and heterocyclic groups such as 2-thiazolyl.

Examples of (meth)acrylamides contained as comonomers in the inventive polymethacrylate resin which is compatible with polycarbonate are N-cyclohexyl(meth)acrylamide, N-2-methylcyclohexylmethacrylamide, and N-2-thiazolylmethacrylamide.

A particularly preferred polycarbonate (A) is the reaction product of bisphenol A and phosgene.

A principal distinction between the copolymer (B) as well as the monomer of formula I contained therein and the copolymers and monomers described in Ger. Pat. App. No. P 35 18 538.4 is that copolymer (B) and its monomers of formula I have no appreciable absorption over the entire visible spectrum and into the UV spectrum as far wavelength 340 nm.

The present polymethacrylate resins compatible with polycarbonates (particularly with polycarbonates of bisphenol A) are basically produced from methyl methacrylate. According to the invention, the methacrylate polymer contains acrylamide and/or methacrylamide units of the above-described formula in its polymer structure, in the amount of 5–25 wt. %. The copolymer may also contain additional $\alpha,\beta$-unsaturated monomer units, e.g. styrene, $\alpha$-methylstyrene, acrylic acid, or acrylic acid esters, in the amount of 0–wt. %.

The copolymer is prepared according to known methods of polymerizing $\alpha,\beta$-unsaturated compounds, particularly radical polymerization, for example in bulk or in solution or in a bead suspension. Radical polymerization initiators which may be used are azo compounds (e.g. azodiisobutyronitrile), peroxides (e.g. dibenzoyl peroxide or dilauroyl peroxide), redox systems; or the initiating radicals may be produced by radiation chemistry.

It is known that the compatibility of polymers in mixtures depends on their degree of polymerization, with the compatibility generally decreasing with increasing molecular weight of the polymer, thereby resulting in a two-phase or three-phase mixture. According to the invention, the methyl methacrylate copolymers used in the polycarbonate-polymethacrylate "alloys" have molecular weights above 30,000, namely about 30,000–200,000, preferably about 50,000–100,000, and have "reduced viscosities"

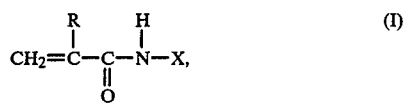

measured according to DIN 51 562 of 18–65 ml/g, preferably 30–50 ml/g. Thus, for example, methyl methacrylate copolymers containing N-cyclohexylmethacrylamide or N-benzylmethacrylamide in the amount of 6–10 wt. % and having a reduced viscosity of 33 ml/g are compatible with bisphenol A polycarbonate (e.g. Makrolon ® 1158) over the entire alloy range. Such copolymers with controlled molecular weights are prepared, particularly by polymerization in the presence of known propagation regulators such as mercaptans.

The inventive polycarbonate-compatible methyl methacrylate copolymers can be processed thermoplastically to produce highly transparent, color less molded products having Vicat softening temperatures (measured according to DIN 53 460) of about 100°–110° C.

The polycarbonates used in the inventive compatible mixtures with the methyl methacrylate(meth)acrylamide (I) copolymers are, in particular, aromatic polycarbonates, particularly bisphenol A polycarbonates.

Polycarbonates of bisphenol A are highly transparent, tough plastics. Commercial versions are available under the trade name Makrolon ®. The molecular weights of carbonate polymers based on these plastics are about 20,000–40,000, and the Vicat softening temperatures (DIN 53 460) of these plastics are about 140° C.

The alloys of the plastics of the two types are transparent plastic systems which can have additional properties which may be more valuable than those of the individual unalloyed plastics. For example, when thermoplastic polymethacrylate plastic is added to bisphenol A polycarbonate which by itself has high viscosity in the molten state, thermoplastic processibility of the material can be improved without substantial detrimental changes in other properties of the polycarbonate. In contrast, in known alloys of the polycarbonate with lower molecular weight acrylic polymers detrimental changes are experienced.

The inventive polymer mixtures can be processed into a wide variety of molded products. An example is optically readable information storage media. The materials used presently for manufacturing such products, namely bisphenol A polycarbonate and polymethyl methacrylate, cause problems with regard to optical birefringence and water uptake. Thus, the inventive materials provide significant advantages.

Other features of the invention will become apparent in the course of the following descriptions of exemplary embodiments which are given for illustration of the invention and are not intended to be limiting thereof.

EXAMPLES

Example 1—Preparation of the Copolymer

First, 8 parts by weight N-cyclohexylmethacrylamide, then 0.2 parts by weight dilauroyl peroxide (initiator) and 1 part by weight 2-ethylhexyl thioglycolate (molecular weight regulator) were dissolved in 92 parts by weight methyl methacrylate (MMA). This mixture was polymerized in a film tube in a water bath at 50° C., for 22 hr, and was then heat treated 3 hr at 110° C. in a drying cabinet to complete the reaction. The resulting copolymer, which was later used to prepare polymer "alloys" according to Examples 2–5, was colorless and highly transparent, and had mean molecular weight Mw=64,000.

The copolymers used in Examples 6–10 were prepared analogously, with variations in the comonomer components and in the amoun of regulator used.

EXAMPLES 2–5

Makrolon ® 1158 and the copolymer prepared according to Example 1 were mixed in the given proportions and granulated together in a Stork single screw extruder. Test plates 3 mm thick were injection molded from the resulting uniform particle size granulate, using an Anker injection molding machine. The plates were visually examined, and the Vicat softening temperature was measured according to DIN 53 460. All the injection molded test plates were highly transparent and colorless.

| Example No. | Makrolon/ Copolymer (wt. %) | Appearance of the molded plates | Vicat Softening Temperature (°C.) |
| --- | --- | --- | --- |
| 2 | 20/80 | clear, colorless | 115 |
| 3 | 40/60 | clear, colorless | 118 |
| 4 | 60/40 | clear, colorless | 123 |
| 5 | 80/20 | clear, colorless | 130 |

EXAMPLE 6

Makrolon ® 1189 was mixed in a ratio 75:25 with a copolymer comprised of MMA (92 parts by weight) and N-phenylmethacrylamide (MW=36,000; 8 parts by weight), and was extruded to a 2 mm thick plate on a Stork single screw extruder.

The plate was colorless and clear. The Vicat softening temperature was 127° C.

EXAMPLE 7

Makrolon ® 1158 was mixed in a ratio 50:50 with a copolymer comprised of MMA (94 parts by weight) and N-benzylmethacrylamide (MW=110,000; 6 parts by weight), and was extruded to a 3 mm thick plate on a Stork single screw extruder.

The plate was colorless and clear. The Vicat softening temperature was 122° C.

EXAMPLE 8

The procedure was as in Example 7 but the copolymer employed was comprised of MMA (92 parts by weight) and N-(2-thiazolyl)-methacrylamide (MW=80,000; 8 parts by weight). The plate produced was clear, with a slight yellow tint.

EXAMPLE 9

Makrolon ® 2800 was mixed in a ratio 80:20 with a copolymer comprised of MMA (94 parts by weight) and cyclohexylmethacrylamide (MW=34,000; 6 parts by weight), and was granulated in a single screw extruder. The granulate was injection molded to form 3 mm thick plates and standard small bars. The test bodies were colorless and clear. The Vicat softening temperature of the plates was 132° C. The impact test according to DIN 53 453 did not result in fractures of the bars.

EXAMPLE 10

Makrolon ® 1158 was mixed in a ratio 75:25 with a copolymer comprised of MMA (85 parts by weight) and N-benzylmethacrylamide (MW=106,000; 15 parts by weight), and was granulated. A 4 mm thick extrusion molded plate was fabricated from the granulate at 180° C., and a strip cut from this plate was elongated by 50% monoaxially. The birefringence measured on this strip was $+5 \times 10^{-5}$, which was far less than that for similarly fabricated test bodies comprised of polymethyl methacrylate ($-1.4 \times 10^{-4}$) and Makrolon ® ($+2.5 \times 10^{-3}$). The inventive polymer alloy of this Example is very well suited for manufacturing of optically readable data storage media.

The inventive transparent polymer mixtures such as described in the Examples, but not limited to those described in the Examples satisfy the criteria of the "transition temperature method" and the "optical method", with regard to compatible polymer mixtures, as described in 1975 "Polymer Handbook", 2nd Ed., John Wiley & Sons., Chapter III ("Compatible Polymers"), p. 211.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent, thermoplastically processible polymer mixture, comprising:
   (A) an aromatic polycarbonate; and
   (B) a methacrylate copolymer; wherein said methacrylate copolymer comprises
      (i) 65–95 wt. % methyl methacrylate monomer units; and
      (ii) 5–25 wt. % monosubstituted(meth)acrylamide monomer units having the formula

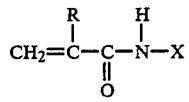

wherein R is H or a methyl and X is a substituted or unsubstituted cycloaliphatic, aromatic or heterocyclic organic group, wherein X has no appreciable absorption capability for visible light as far as the UV wavelength of 340 nm, and wherein said copolymer (B) has a molecular weight > 30,000.

2. The polymer mixture of claim 1, wherein said copolymer (B) further comprises up to 20 wt. % $\alpha,\beta$-unsaturated monomer units.

3. The polymer mixture of claim 1, wherein X is a cyclohexyl group.

4. The polymer mixture of claim 3, wherein X is a methylcyclohexyl group.

5. The polymer mixture of claim 1, wherein X is a benzyl group.

6. The polymer mixture of claim 2, wherein said $\alpha,\beta$-unsaturated monomer unit comprises a member selected from the group consisting of styrene, $\alpha$-methyl styrene, acrylic acid, and acrylic acid ester units.

7. The polymer mixture of claim 1, wherein said polycarbonate is bisphenol A polycarbonate.

8. The polymer mixture of claim 1, wherein said methacrylate copolymer has a molecular weight of about 30,000–200,000.

9. The polymer mixture of claim 8, wherein said methacrylate copolymer has a molecular weight of about 50,000–100,000.

10. A method of preparing an optically readable information storage unit, comprising molding said storage unit from the transparent, thermoplastically processable polymer mixture of claim 1.

* * * * *